United States Patent
Nakamura et al.

(10) Patent No.: US 6,958,584 B2
(45) Date of Patent: Oct. 25, 2005

(54) LAMP DRIVING APPARATUS AND METHOD FOR DRIVING LAMP

(75) Inventors: Yoshihide Nakamura, Shizuoka (JP); Mitsuaki Morimoto, Shizuoka (JP); Yoshinori Ikuta, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 6 days.

(21) Appl. No.: 10/726,679

(22) Filed: Dec. 4, 2003

(65) Prior Publication Data

US 2004/0164687 A1    Aug. 26, 2004

(30) Foreign Application Priority Data

Dec. 5, 2002    (JP) .................... P. 2002-354021

(51) Int. Cl.[7] .............................................. H05B 37/02
(52) U.S. Cl. .................... 315/360; 315/312; 315/307; 315/291; 315/82; 307/10.8; 307/29
(58) Field of Search .................. 315/80, 82, 83, 315/291, 297, 307, 312, 313, 360, 362, 317, 315/224; 307/10.8, 28, 29, 10.1

(56) References Cited

U.S. PATENT DOCUMENTS

| 4,727,261 A | | 2/1988 | Fairchild | |
| 5,418,435 A | * | 5/1995 | Yamada | .................... 315/308 |
| 5,544,037 A | | 8/1996 | Luger | |
| 5,621,277 A | | 4/1997 | Ricca | |
| 6,049,171 A | * | 4/2000 | Stam et al. | .................... 315/82 |
| 6,566,816 B2 | * | 5/2003 | Fushimi et al. | ............... 315/82 |
| 2002/0175642 A1 | | 11/2002 | Von Kannewurff et al. | |

FOREIGN PATENT DOCUMENTS

| JP | 5-26629 | 4/1993 |
| JP | 2001-239879 | 9/2001 |
| JP | 2001239879 | 9/2004 |

* cited by examiner

*Primary Examiner*—Haissa Philogene
(74) *Attorney, Agent, or Firm*—Finnegan, Henderson, Farabow, Garrett & Dunner, L.L.P.

(57) ABSTRACT

A lamp driving apparatus includes a controller, generating a control signal for lighting at least one of plural sets of lamps, each set having at least a first lamp and a second lamp, and generating a switching signal; and a lamp driver, supplying power to the at least one of sets of lamps in accordance with both of the control signal and the switching signal. The switching signal causes the lamp driver to apply voltage to the first lamp and the second lamp of each of the at least one of sets of lamps with a shift of a prescribed time.

20 Claims, 4 Drawing Sheets

LAMP DRIVING APPARATUS AND METHOD FOR DRIVING LAMP

BACKGROUND OF THE INVENTION

The present invention relates to a lamp driving apparatus and a method for driving a lamp having a filament such as an incandescent bulb.

In general, a lamp driving apparatus capable of controlling a lamp driving includes a controller for producing a lighting/non-lighting control signal in accordance with an instruction signal that is output from an instruction device having a switch, a sensor, or the like and serves as an instruction to turn on or off a lamp and a driving section for supplying power to the lamp in accordance with the lighting/non-lighting control signal. When receiving an instruction signal as an instruction to turn on or off the lamp, the controller causes the driving section to apply or not to apply a voltage to the lamp.

Among such lamp driving apparatus is one capable of dimming auxiliary lamps of a vehicle (i.e., lighting the lamps at low luminance) by PWM (pulse width modulation) control in accordance with the situation (refer to JP-UM-A-5-26629 (pages 6–9, FIG. 1), for example). Different from lamp driving that merely applies a DC voltage to a lamp Hereinafter referred to as "DC lamp driving"), the lamp driving by PWM control (hereinafter referred to as "PWM lamp driving") can adjust the brightness of a lamp finely because it can vary the duty cycle of a pulse voltage that is applied to the lamp. As is well known, it goes without saying that lamp driving apparatus capable of performing PWM lamp driving can also perform DC lamp driving.

Incidentally, vehicles (what is called 14-V vehicles) that incorporate a power section (rated output voltage: DC 12–14 V) having a 14-V alternator and a 12-V battery that can be charged and discharge are known as common vehicles. Lamp driving apparatus of such 14-V vehicles perform DC lamp driving by applying DC voltages of 12–14 V to various lamps while their driving section is supplied with power from the power section (rated output voltage: DC 12–14 V). Depending on the lamp driving specification, the lamp driving apparatus also perform PWM lamp driving by applying pulse voltages having a DC component of 12–14 V.

In recent years, various efforts have been made to develop fuel-efficient, high-voltage vehicles (what is called 42-V vehicles) that incorporate a power section (rated output voltage: DC 36–42 V) having a 42-V motor/generator and a 36-V battery that can be charged and discharge. At present, for a transition from 14-V vehicles to 42-V vehicles, to use, also in 42-V vehicles, various general-purpose lamps that are used in 14-V vehicles that are advantageous in cost, lamp driving apparatus for driving those lamps for 14-V vehicles are being studied. Such lamp driving apparatus perform PWM lamp driving by applying a pulse voltage having a DC component of 36–42 V to various lamps while their driving section is supplied with power from the power section (rated output voltage: DC 36–42 V). That is, the PWM lamp driving properly adjusts (i.e., decreases) the power that is supplied to the 14-V lamps by applying pulse voltages having a proper pulse width to the lamps.

However, in the above PWM lamp driving, in the case where a plurality of lamps are lit during a night drive or the like, if switching signals (i.e., PWM signals) are applied, with the same timing, to switching elements (e.g., transistors or FETs) that are provided for the respective lamps, large rush currents flow from the power section into the filaments of the lamps instantaneously at the start of application of the voltages, as a result of which a large noise pulse (i.e., switching noise) appears on the power line. This is a serious problem particularly in 42-V vehicles in which the output voltage of the power section is high.

On the other hand, to solve the above problem, a lamp driving apparatus has been proposed which drives a plurality of lamps for their switched lighting by supplying switching elements corresponding to the respective lamps with switching signals whose switching on-periods are shifted from each other (refer to JP-A-2001-239879 (pages 3–5, FIGS. 1–3), for example).

Figure 3:
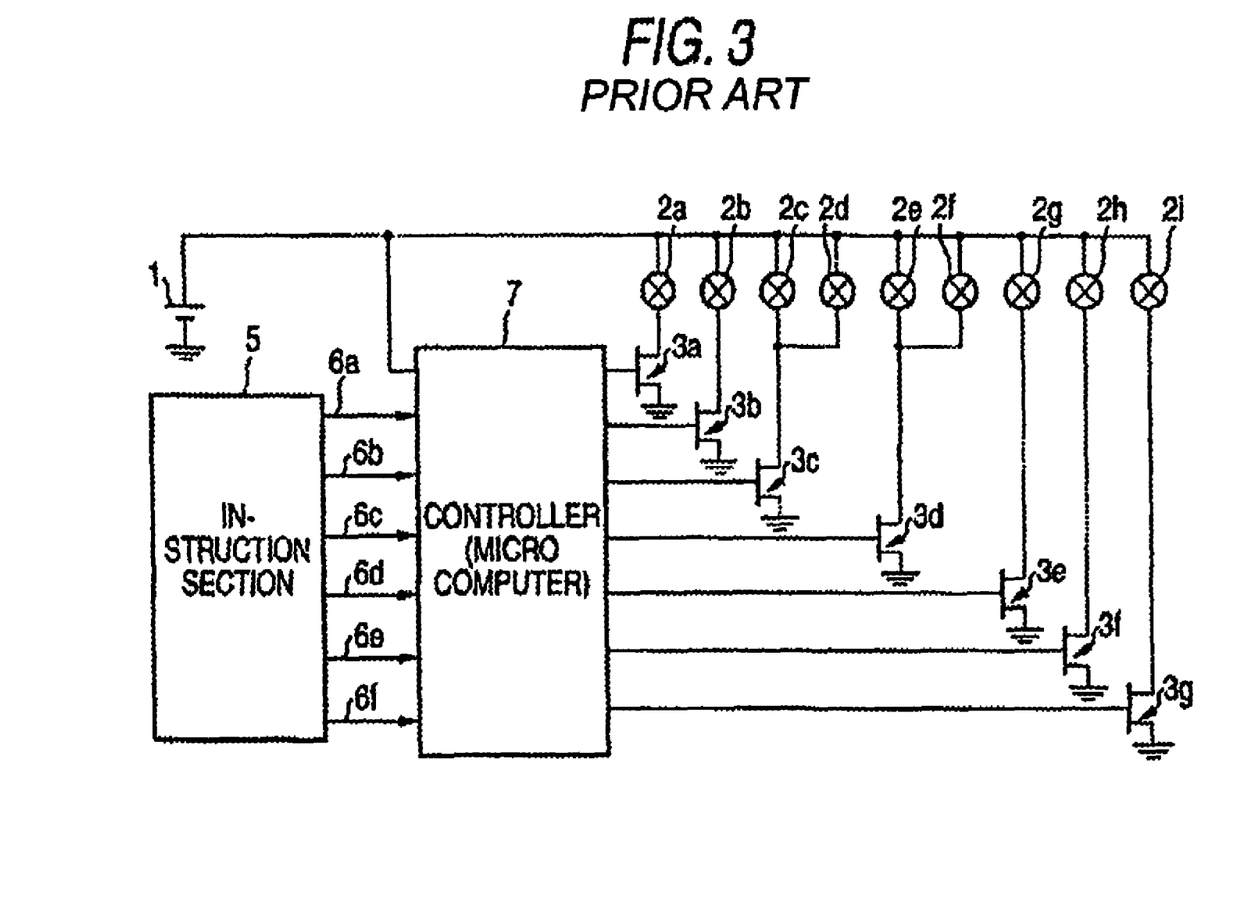
FIG. 3 is a circuit block diagram of a related lamp driving apparatus.

FIG. 3 is a circuit block diagram schematically showing a lamp driving apparatus disclosed in JP-A-2001-239879. FIG. 3 shows a related lamp driving apparatus that is equipped with a plurality of lamps $2a$–$2i$ (a headlamp (right) $2a$, a headlamp (left) $2b$, fog lamps (right/left) $2c$, $2d$, tail lamps (right/left) $2e$, $2f$, a direction-indicating lamp (right) $2g$, direction-indicating lamp (left) $2h$, backup lamps (right/left) $2i$) that are provided on a vehicle, a power section (i.e., battery) 1 for supplying power for lighting the lamps $2a$–$2i$, and an instructing member 5 having a plurality of lamp lighting instruction switches or the like for making instructions to light the respective lamps $2a$–$2i$. This lamp driving apparatus is also equipped with a plurality of switching elements $3a$–$3g$ for lighting the respective lamps $2a$–$2i$ by supplying currents to those and a controller 7 for supplying corresponding ones of the switching elements $3a$–$3g$ with switching signals for lighting lamps that the controller 7 has been instructed to light by the instructing member 5. The lamps $2a$–$2i$ are right and left headlamps, right and left fog lamps, right and left tail lamps, right and left direction-indicating lamps, right and left backup lamps, etc.

Figure 4:
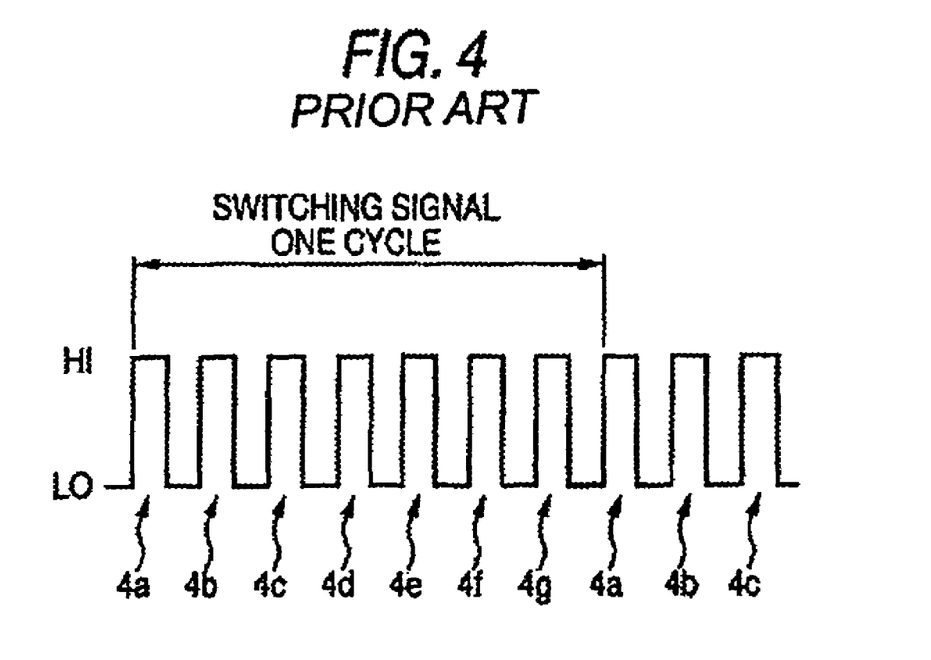
FIG. 4 is a timing chart showing signals at individual points in the circuit block diagram of FIG. 3.

In this lamp driving apparatus, when lighting instruction switches for some of the headlamps, fog lamps, tail lamps, direction-indicating lamps, backup lamps, etc. are turned on as instructions to turn on corresponding ones of the lamps $2a$–$2i$, part of input signals $6a$–$6f$ corresponding to the turned-on switches are input to the controller 7. As shown in FIG. 4, the controller 7 supplies part of switching signals $4a$–$4g$ (headlamp (right) $4a$, direction-indicating lamp $4b$, fog lamp $4c$, direction-indicating lamp $4d$, headlamp (left) $4e$, tail lamp $4f$, backup lamp $4g$) that are shifted from each other in time to part of the switching elements $3a$–$3g$ corresponding to the respective lighting-instructed ones of lamps $2a$–$2i$ and thereby lighting-drives those lamps sequentially. Since an event that voltages are applied to (part of) the lamps $2a$–$2i$ simultaneously is prevented, large switching noise is prevented from occurring on the power line.

However, in the above lamp driving apparatus, the controller 7 needs to supply switching signals to the switching elements $3a$–$3g$ for the respective lamps $2a$–$2i$ so as to shift the output time sequentially and continues such an output control. This complicates the configuration and the control procedure of the controller 7 of the lamp driving apparatus.

For example, where the above control is performed by software, interrupt routines are provided in the same number as the number of switching elements $3a$–$3g$, which makes the control complex and may impair the reliability of the control. This may make it necessary to use an expensive microprocessor. Where the control is performed by hardware, it is unavoidable that the circuit configuration becomes complex and the number of parts used increases accordingly, resulting in cost increase of the entire system. The related lamp drive apparatus has those problems to be solved.

SUMMARY OF THE INVENTION

It is therefore an object of the present invention to provide a lamp driving apparatus and a lamp driving method capable of simplifying the lamp lighting control procedure and the configuration of a controller by alternately driving, that is, driving with a shift in time, a first lamp and a second lamp of each of at least one lighting-instructed set among plural sets of at least two lamps using two kinds of sets of signals such as switching signals and lighting/non-lighting control signals.

In order to achieve the above object, according to the present invention, there is provided a lamp driving apparatus comprising:

a controller, generating a control signal for lighting at least one of plural sets of lamps, each set having at least a first lamp and a second lamp, and generating a switching signal; and a lamp driver, supplying power to the at least one of sets of lamps in accordance with both of the control signal and the switching signal, wherein the switching signal causes the lamp driver to apply voltage to the first lamp and the second lamp of each of the at least one of sets of lamps with a shift of a prescribed time.

In the above configuration, when receiving instruction signals as instructions to turn on designated sets of lamps, the controller of the lamp driving apparatus controls the lamp lighting driving of the lamp driver using two kinds of sets of signals that are control signals for instructing the lamp driver to light the designated sets of lamps and a switching signal for causing the lamp driver to apply voltages to a first lamp and a second lamp of each of the designated sets with a shift of a prescribed time. Therefore, simultaneous application of voltages to the lamps of each designated set is prevented, which suppresses noise occurring on the power line. In addition, this invention can be applied to both of the DC lamp driving and the PWM lamp driving. And this invention can be implemented by changing the way the controller controls the lamp driver without increasing the number of components or control steps from those in the related DC lamp driving or PWM lamp driving. As such, the this invention makes it to take a countermeasure against rush current without cost increase.

Preferably, the lamp driver performs a logical multiplication operation on the control signal and the switching signal, and supplies the power to the sets of lamps in accordance with operation results.

In the above configuration, the lamp driver performs a logical multiplication operation on each of the control signals and the switching signal and supplies power to the designated sets of lamps in accordance with operation results. Therefore, a control of lighting the lamps of each designated set with a shift in time using the two kinds of signals, that is, a control signal and a switching signal can easily performed by using AND gates, for example, which facilitates the software and hardware designing.

Preferably, the controller continues to output the control signal and the switching signal until turning-off of the set of lamps so that the lamp driver continuously applies the voltage to the sets of lamps.

In the above configuration, when receiving the instruction signals as the instructions to turn on the designated sets of lamps, the controller causes the lamp driver to continuously apply voltages to the designated sets of lamps. This invention is suitable for the DC lamp driving.

Preferably, the controller outputs the control signal and the switching signal causing the lamp driver to repeat application and non-application of voltage to the sets of lamps in a prescribed cycle for dimming the sets of lamps.

In the above configuration, when receiving the instruction signals as the instructions to turn on the designated sets of lamps, the controller produces control signals and a switching signal for causing the lamp driver to repeat application and non-application of voltages to the designated sets of lamps in a prescribed cycle, to thereby dim those lamps. This invention is suitable for the PWM lamp driving.

Preferably, the switching signal includes a first switching signal for the first lamp and a second switching signal for the second lamp, the first switching signal being independent of the second switching signal; and wherein the controller monitors the first switching signal and the second switching signal, and generates the first switching signal and the second switching signal causing the lamp driver to apply the voltage to the first lamp and the second lamp with the shift of the prescribed time.

In the above configuration, the switching signal includes a first switching signal for the first lamp of each of the designated sets and a second switching signal for the second lamp that is independent of the first switching signal for the first lamp, and that the controller always monitors the first switching signal for the first lamp and the second switching signal for the second lamp and generates those switching signals so that the lamp driver applies the voltages to the first lamp and the second lamp with the shift of the prescribed time. This makes it possible to perform, by a simple circuit configuration and procedure using such switching signals, a control of reliably lighting the lamps of each designated set with a shift in time to thereby prevent their simultaneous driving.

Preferably, the lamp driver includes a logical multiplication circuit which performs a logical multiplication operation on the control signal and the switching signal, and which outputs a lamp load control signal on the basis of a logic operation result; and a switching element which supplies the power to the sets of lamps in accordance with the lamp load control signal.

In the above configuration, the lamp driver includes logical multiplication circuits (e.g., AND gates) each for performing a logical multiplication operation on each of the control signals and the switching signal and for producing a lamp load control signal on the basis of an operation result, and switching elements for supplying power to the designated sets of lamps in accordance with the lamp load control signals. Therefore, voltages can easily be applied to the lamps of each designated set with a shift in time using the switching element by generating a lamp load control signal on the basis of a result of logical multiplication on the two kinds of signals, that is, a control signal and a switching signal, which facilitates the software and hardware designing.

Preferably, the lamp load control signal includes a first lamp load control signal for the first lamp and a second lamp load control signal for the second lamp, the first load control signal being independent of the second lamp load control signal. The controller monitors the first lamp load control signal and the second lamp load control signal, and generates the first switching signal and the second switching signal causing the lamp driver to apply the voltage to the first lamp and the second lamp with the shift of the prescribed time.

In the above configuration, the lamp load control signal includes a lamp load control signal for the first lamp of each of the designated sets and a lamp load control signal for the second lamp that is independent of the lamp load control signal for the first lamp, and that the controller always monitors the lamp load control signal for the first lamp and the lamp load control signal for the second lamp and generates the switching signal so that the lamp driver applies the voltages to the first lamp and the second lamp with the shift of the prescribed time. This makes it possible to perform, by a simple circuit configuration and procedure using such lamp load control signals, a control of reliably lighting the lamps of each designated set with a shift in time to thereby prevent their simultaneous driving.

Preferably, the lamp is incandescent bulb having a filament.

In the above configuration, it is possible to suppress noise occurring on the power line due to rush current at the initial stage of a lamp lighting period even if the lamps are incandescent bulbs having a filament.

According to the present invention, there is also provided A lamp driving apparatus, comprising:

a controller, generating a control signal for lighting at least one of plural sets of lamps, each set having at least a first lamp and a second lamp, and generating a switching signal, and outputting a lamp load control signal on the basis of the control signal and the switching signal; and a lamp driver, supplying power to the at least one of sets of lamps in accordance with the lamp load control signal, wherein the lamp load control signal causes the lamp driver to apply voltage to the first lamp and the second lamp of each of the at least one of sets of lamps with a shift of a prescribed time.

In the above configuration, when receiving instruction signals as instructions to turn on designated sets of lamps, the controller of the lamp driving apparatus controls the lamp lighting driving of the lamp driver by generating control signals for lighting or not lighting those lamps and a switching signal and outputting, on the basis of instructions indicated by both of the two kinds of set of signals, that is, the control signals and the switching signal, lamp load control signals for causing the lamp driver to apply voltages to a first lamp and a second lamp of each of the designated sets with a shift of a prescribed time. Therefore, simultaneous application of voltages to the lamps of each designated set is prevented, which suppresses noise occurring on the power line. In addition, this invention can be applied to both of the DC lamp driving and the PWM lamp driving. And this invention can be implemented by changing the way the controller controls the lamp driver without increasing the number of components or control steps from those in the related DC lamp driving or PWM lamp driving. As such, the this invention makes it to take a countermeasure against rush current without cost increase.

Preferably, the controller performs a logical multiplication operation on the control signal and the switching signal, and generates the lamp load control signal causing the lamp driver to supply the power to the sets of lamps in accordance with operation results.

In the above configuration, the controller performs a logical multiplication operation on each of the control signals and the switching signal, and generates, in accordance with operation results, lamp load control signals for causing the lamp driver to supply power to the designated sets of lamps. Therefore, a control of lighting the lamps of each designated set with a shift in time can easily performed by using AND gates, for example, which facilitates the software and hardware designing.

Preferably, the controller continues to output the lamp load control signal until turning-off of the set of lamps so that the lamp driver continuously applies the voltage to the sets of lamps.

In the above configuration, when receiving the instruction signals as the instructions to turn on the designated sets of lamps, the controller causes the lamp driver to continuously apply voltages to the designated sets of lamps. This invention is suitable for the DC lamp driving.

Preferably, the controller outputs the lamp load control signal causing the lamp driver to repeat application and non-application of voltage to the sets of lamps in a prescribed cycle for dimming the sets of lamps.

In the above configuration, when receiving the instruction signals as the instructions to turn on the designated sets of lamps, the controller output lamp load control signals for causing the lamp driver to repeat application and non-application of voltages to the designated sets of lamps in a prescribed cycle, to thereby dim those lamps. This invention is suitable for the PWM lamp driving.

Preferably, the switching signal includes a first switching signal for the first lamp and a second switching signal for the second lamp, the first switching signal being independent of the second switching signal. The controller monitors the first switching signal and the second switching signal, and generates the first switching signal and the second switching signal causing the lamp driver to apply the voltage to the first lamp and the second lamp with the shift of the prescribed time.

In the above configuration, the switching signal includes a switching signal for the first lamp of each of the designated sets and a switching signal for the second lamp that is independent of the switching signal for the first lamp, and that the controller always monitors the switching signal for the first lamp and the switching signal for the second lamp and generates those switching signals so that the lamp driver applies the voltages to the first lamp and the second lamp with the shift of the prescribed time. This makes it possible to perform, by a simple circuit configuration and procedure using such switching signals, a control of reliably lighting the lamps of each designated set with a shift in time to thereby prevent their simultaneous driving.

Preferably, the controller includes a logical multiplication circuit which performs a logical multiplication operation on the control signal and the switching signal, and which generates the lamp load control signal on the basis of a logic operation result. The lamp driver includes a switching element which supplies the power to the sets of lamps in accordance with the lamp load control signal.

In the above configuration, the controller comprises logical multiplication circuits (e.g., AND gates) each for performing a logical multiplication operation on each of the control signals and the switching signal and for producing a lamp load control signal on the basis of an operation result, and that the lamp driver comprises switching elements for supplying power to the designated sets of lamps in accordance with the lamp load control signals. Therefore, voltages can easily be applied to the lamps of each designated set with a shift in time using the switching element by generating a lamp load control signal on the basis of a result of logical multiplication on the two kinds of signals, that is, a control signal and a switching signal, which facilitates the software and hardware designing.

Preferably, the lamp load control signal includes a first lamp load control signal for the first lamp and a second lamp load control signal for the second lamp, the first load control signal being independent of the second lamp load control signal. The controller monitors the first lamp load control signal and the second lamp load control signal, and generates the first switching signal and the second switching signal causing the lamp driver to apply the voltage to the first lamp and the second lamp with the shift of the prescribed time.

In the above configuration, the lamp load control signal includes a lamp load control signal for the first lamp of each of the designated sets and a lamp load control signal for the second lamp that is independent of the lamp load control signal for the first lamp, and that the controller always monitors the lamp load control signal for the first lamp and the lamp load control signal for the second lamp and generates the switching signal so that the lamp driver applies the voltages to the first lamp and the second lamp with the shift of the prescribed time. This makes it possible to perform, by a simple circuit configuration and procedure using such lamp load control signals, a control of reliably lighting the lamps of each designated set with a shift in time to thereby prevent their simultaneous driving.

Preferably, the lamp is incandescent bulb having a filament.

In the above configuration, it is possible to suppress noise occurring on the power line due to rush current at the initial stage of a lamp lighting period even if the lamps are incandescent bulbs having a filament.

According to the present invention, there is also provided a method for driving lamp, comprising the steps of:

providing a plurality of sets of lamps, each set having at least a first lamp and a second lamp; and applying voltage to a first lamp and a second lamp of each of the at least one of the sets of lamps with a shift of a prescribed time.

Preferably, the method for driving lamp further comprises the step of monitoring the shift of the voltage to be applied to the first lamp and the second lamp.

Preferably, the voltage is continuously applied to the set of lamps after the sets of lamps are turned on.

Preferably, voltage application and non-application to the sets of lamps are repeated in a prescribed cycle so that the set of lamps are dimmed after the sets of lamps are turned on.

Preferably, the lamp is incandescent bulb having a filament. "The lamp driving method is characterized in that, voltage application and non-application to each of the lamps of the designated sets are repeated in a prescribed cycle to dim those lamps after those lamps are turned."

The invention has been described above briefly. The details of the invention will become more apparent by reading the embodiment of the invention described below with reference to the accompanying drawings.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment of the present invention will be hereinafter described in detail with reference to the drawings.

Figure 1:
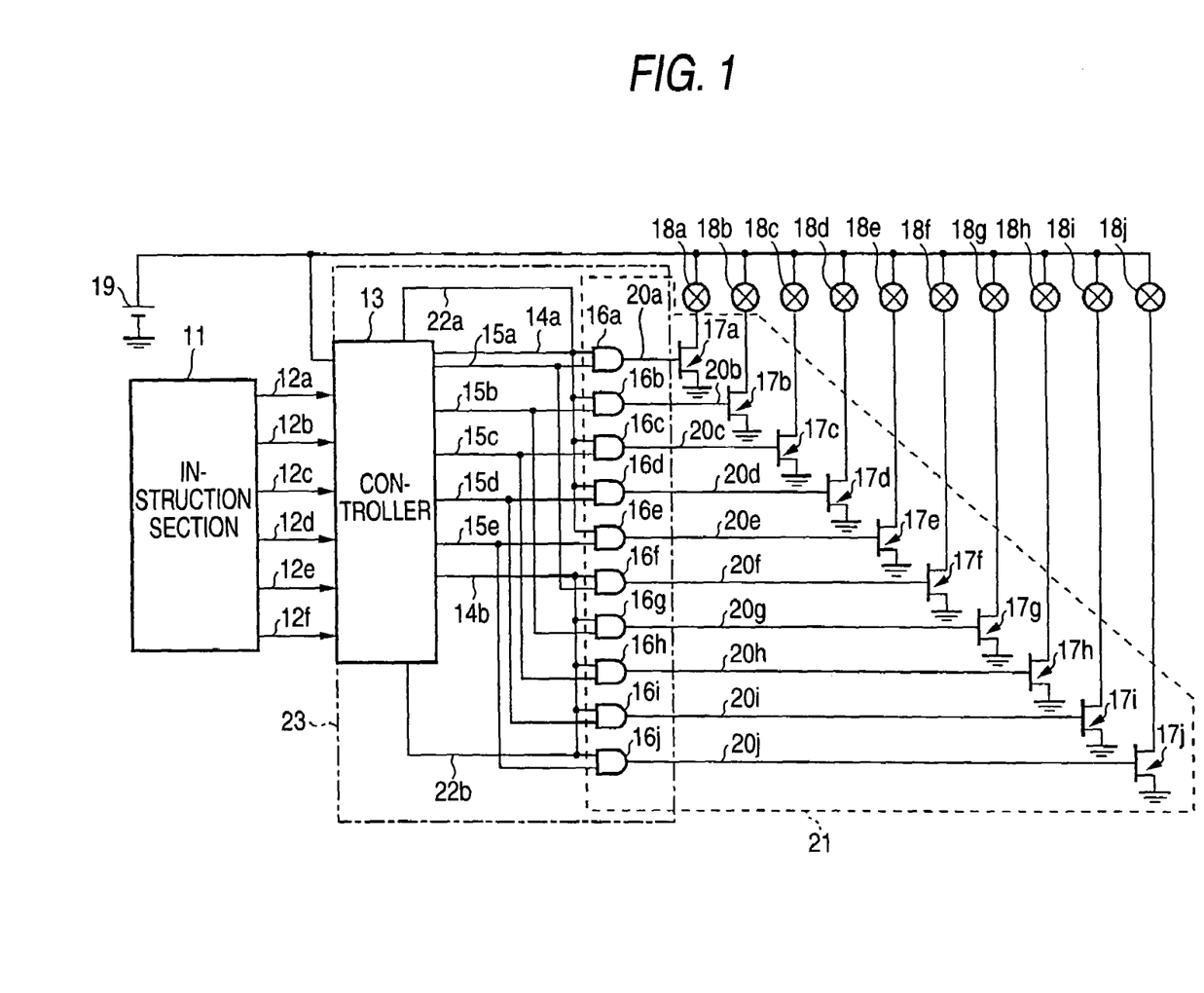
FIG. 1 shows a lamp driving apparatus according to an embodiment of the present invention, and is, in particular, a circuit block diagram of case that the invention is applied to a vehicular lamp driving apparatus to be mounted on a vehicle, the lamp driving apparatus serving to drive a plurality of right-hand lamps and a plurality of left-hand lamps that are attached to the right side and the left side of the vehicle, respectively.

As shown in FIG. 1, an instructing section 11 designates corresponding ones of headlamps 18$a$ and 18$f$, fog lamps 18$b$ and 18$g$, tail lamps 18$c$ and 18$h$, direction-indicating lamps 18$d$ and 18$i$, backup lamps 18$e$ and 18$j$, etc. in response to manipulations of some of a headlamp switch, a fog lamp switch, a tail lamp switch, a direction-indicating lamp switch, a backup lamp switch, etc. (none of these switches are shown), and supplies a controller 13 with part of instruction signals 12$a$–12$f$ as instructions to turn on or off the designated lamps. The instruction signals 12$a$–12$f$ to be supplied to the controller 13 as instructions to turn on or off the respective lamps 18$a$–18$j$ (a headlamp (right) 18$a$, a fog lamp (right) 18$b$, a tail lamp (right) 18$c$, a direction-indicating lamp (right) 18$d$, a backup lamp (right) 18$e$, a headlamp (left) 18$f$, a fog lamp (left) 18$g$, a tail lamp (left) 18$h$, a direction-indicating lamp (left) 18$i$, a backup lamp (left) 18$j$) may be generated on the basis of pieces of lamp lighting instruction information that are externally input by radio communication or wired communication rather than switching inputs of the above switches.

The lamp driving apparatus according to the embodiment includes the controller 13 for producing control information such as lighting/non-lighting control signals 15$a$–15$e$ for lighting or not lighting designated lamps and switching signals 14$a$ and 14$b$ in response to instruction signals 12$a$–12$f$ and a driving section 21 for supplying power to the designated lamps according to instructions indicated by both of the lighting/non-lighting control signals 15$a$–15$e$ and the switching signals 14$a$ and 14$b$.

The controller 13 is electrically connected to the instructing section 11. In response to at least one of instruction signals 12$a$–12$f$ for designating at least one of plural pairs of a right-hand lamp and a left-hand lamp from the lamps 18$a$–18$j$ as an instruction to turn on or off the designated pair of lamps, the controller 13 produces at least one of lighting/non-lighting control signals 15$a$–15$e$ for lighting or not lighting designated lamps and switching signals 14$a$ and 14$b$. In this embodiment, the controller 13 is a microcomputer consisting of semiconductor integrated circuits etc.

More specifically, when receiving one of instruction signals 12$a$–12$f$ as an instruction to turn on a designated pair of lamps, the controller 13 supplies the driving section 21 with a corresponding one of lighting/non-lighting signals 15$a$–15$e$ and switching signals 14$a$ and 14$b$ for applying voltages to the designated lamps. When receiving one of instruction signals 12$a$–12$f$ as an instruction to turn off a designated pair of lamps, the controller 13 supplies the driving section 21 with a corresponding one of lighting/non-lighting signals 15$a$–15$e$ and switching signals 14$a$ and 14$b$ for not applying voltages to the designated lamps.

The switching signals 14a and 14b that are output from the controller 13 when it has received the corresponding one of instruction signals 12a–12f as the instruction to turn on the designated pair of lamps are signals for causing the driving section 21 to apply voltages to a first lamp (e.g., the right headlamp) and a second lamp (e.g., the left headlamp) of the designated pair of lamps at instants that are shifted from each other by a prescribed time.

Figure 2:
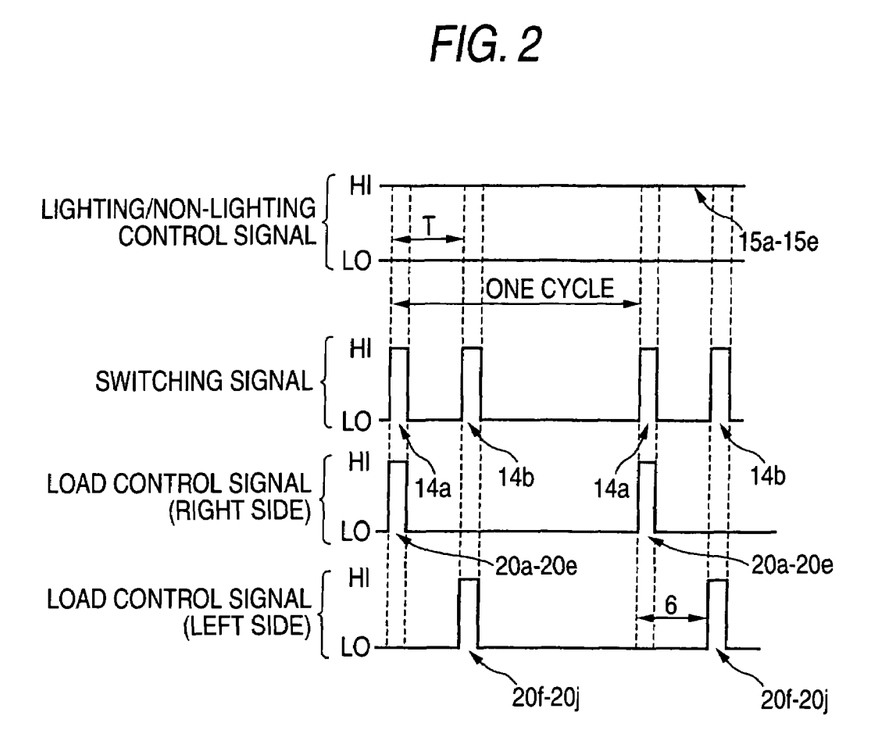
FIG. 2 is a timing chart of signals at individual points in the circuit block diagram of FIG. 1, that is, lighting/non-lighting control signals, switching signals, and load control signals for lighting-driving right-hand lamps and left-hand lamps.

The controller has, in addition to a CPU (central processing unit), a PWM circuit, a timing generation timer, a counter, a memory, etc. As shown in FIG. 2, each of the lighting/non-lighting control signals 15a–15e is a signal that is basically kept at a high (HI) level or a low (LO) level (however, switching between the high level and the low level may occur). On the other hand, as shown in FIG. 2, the switching signals 14a and 14b are pulse voltages that are directly output from the PWM circuit of the controller 13.

The driving section 21 is electrically connected to the controller 13. The driving section 21 includes AND gates (logical multiplication circuits) 16a–16f each having, as the two inputs, the right lamp lighting control switching signal 14a and one of the lighting/non-lighting control signals 15a–15e and AND gates (logical multiplication circuits) 16g–16j each having, as the two inputs, the left lamp lighting control switching signal 14b and one of the lighting/non-lighting control signals 15a–15e.

The controller 13 has at least two PWM output ports (not shown; or timer output ports (not shown)) for output of the switching signals 14a and 14b. The switching signals 14a and 14b are output with a shift of a prescribed time T from the controller 13 (see FIG. 2). The controller 13 also has control output ports (not shown) for outputting lighting/non-lighting control signals 15a–15e and switching signal feedback ports (not shown) to which the switching signals 14a and 14b that are output from the PWM output ports (not shown; or timer output ports (not shown)) are input via feedback signal lines 22a and 22b, respectively (see FIG. 1).

As shown in FIG. 1, the feedback signal line 22a is electrically connected to the input terminals of the AND gates 16a–16e to which the switching signal 14a is input. Also, the feedback signal line 22b is electrically connected to the input terminals of the AND gates 16f–16j to which the switching signal 14b is input. However, an alternative configuration is possible in which the feedback signal line 22a is electrically connected to the output terminals of the AND gates 16a–16e from which respective lamp load control signals 20a–20e are output, and the feedback signal line 22b is electrically connected to the output terminals of the AND gates 16f–16j from which respective lamp load control signals 20f–20j are output.

The driving section 21 also has FETs (field-effect transistors) 17a–17j as switching elements whose gate terminals are connected to the output terminals of the AND gates 16a–16j from which the lamp load control signals 20a–20j are output, respectively. In particular, it is desirable that the FETs 17a–17j are switching power transistors capable of handling high power. The AND gates 16a–16j can be implemented as inexpensive circuits formed by transistors etc. or other circuit elements having the same functions as the former circuits. The source terminals of the FETs 17a–17j are grounded and their drain terminals are electrically connected to a high-voltage battery (i.e., power section) 19 via the right headlamp 18a, right fog lamp 18b, right tail lamp 18c, right direction-indicating lamp 18d, right backup lamp 18e, left headlamp 18f, left fog lamp 18g, left tail lamp 18h, left direction-indicating lamp 18i, and left backup lamp 18j, respectively. The DC high voltage of the high-voltage battery 19 is also supplied to the controller 13. In this specification, each of the headlamp, fog lamp, tail lamp, direction-indicating lamp, and backup lamp is abbreviated as "lamp" when necessary.

In the lamp driving apparatus having the above configuration, the power supply voltage is applied from the high-voltage battery 19 to the power input port (not shown) of the controller 13 and the drain terminals of the respective FETs 17a–17j via the power lines, which allows the controller 13 to perform necessary computation and control operations and the lamps 18a–18j to always prepare for lighting.

If lighting of the right headlamp 18a and the left headlamp 18f, for example, is ordered by a manipulation of a headlamp switch (not shown), for example, of the instructing section 11, an instruction signal 12a for that purpose is input to the controller 13. The controller 13 outputs, from a headlamp control output port (not shown), a high (HI)-level lighting/non-lighting control signal 15a on the basis of the instruction signal 12a.

On the other hand, the controller 13 outputs, from a right lamp PWM output port (not shown), a switching signal 14a having a waveform that a high (HI) level and a low (LO) level occur alternately in a fixed cycle. The controller 13 is configured in such a manner as to output a proper switching signal 14a after checking the state of the waveform of a switching signal 14b being output from the left lamp PWM output port (not shown), via the left lamp switching signal feedback port (not shown).

More specifically, the controller 13 always monitors whether the switching signal 14b is at the high (HI) level or the low (LO) level. The controller 13 outputs a high-level switching signal 14a if the switching signal 14b is at the low level, and outputs a low-level switching signal 14a if the switching signal 14b is at the high level. That is, the controller 13 always recognizes the temporal shift of the pulse of the switching signal 14a with respect to the pulse of the switching signal 14b via the feedback signal line 22b (in other words, the left lamp switching signal feedback port (not shown)), which prevents the right headlamp 18a and the left headlamp 18f from being driven with the same timing.

Receiving a high-level lighting/non-lighting control signal 15a and a switching signal 14a, the AND gate 16a supplies a right headlamp load control signal 20a to the gate terminal of the FET 17a for the right headlamp 18a. As a result, the FET 17a is turned on and a current flows from the high-voltage batter 19 through the FET 17a and the right headlamp 18a is turned on by prescribed PWM lamp driving.

Likewise, in addition to outputting, from the headlamp control output port (not shown), the high-level lighting/non-lighting control signal 15a, the controller 13 outputs, from a left lamp PWM output port (not shown), a switching signal 14b having a waveform that a high level and a low level occur alternately in a fixed cycle. The controller 13 is configured in such a manner as to output a proper switching signal 14b after checking the state of the waveform of a switching signal 14a being output from the right lamp PWM output port (not shown) via the right lamp switching signal feedback port (not shown).

More specifically, the controller 13 always monitors whether the switching signal 14a is at the high (HI) level or the low (LO) level. The controller 13 outputs a high-level switching signal 14b if the switching signal 14a is at the low level, and outputs a low-level switching signal 14b if the switching signal 14a is at the high level. That is, the controller 13 always recognizes the temporal shift of the pulse of the switching signal 14b with respect to the pulse of the switching signal 14a via the feedback signal line 22a (in other words, the right lamp switching signal feedback port (not shown)), which prevents the right headlamp 18a and the left headlamp 18f from being driven with the same timing.

Receiving a high-level lighting/non-lighting control signal 15a and a switching signal 14b, the AND gate 16f supplies a left headlamp load control signal 20f to the gate terminal of the FET 17f for the left headlamp 18f. As a result, the FET 17f is turned on and a current flows from the high-voltage batter 19 through the FET 17f and the left headlamp 18f is turned on by prescribed PWM lamp driving with a shift of the prescribed time T (see FIG. 2). That is, the voltage application to the headlamp 18f is delayed from that to the headlamp 18a by the prescribed time T.

As described above, since the pulse of the right lamp switching signal 14a and the pulse of the left lamp switching signal 14b are shifted from each other in time, the driving instant of the right headlamp 18a and that of the left headlamp 18f are likewise shifted from each other in time. This makes it possible to suppress occurrence of noise on the power line in contrast to the case that the two kinds of pulses are generated with the same timing, that is, without a shift in time.

The controller 13 not only generates switching signals 14a and 14b and lighting/non-lighting control signals 15a–15e in the above-described manner but also controls the shift between pulses of the switching signals 14a and 14b (i.e., recognizes the relationship between such two signals as the switching signals 14a and 14b). This simplifies the hardware configuration and facilitates the software designing in contrast to the case of the related technique shown in FIGS. 3 and 4 in which a control is performed so as to shift pulses for the respective lamps (in other words, time slots are set for pulses of a switching signal for the respective lamps as shown in FIG. 4 and the temporal shifts between the pulses should be checked all the time). As a result, the microcomputer as the controller 13 can be obtained at a low cost and the number of parts is reduced, the controller 13 providing advantages that the operation can be made more reliable and the cost of the entire lamp driving apparatus can be reduced.

The lighting control on the right headlamp 18a and the left headlamp 18f has been described above as an example. The lighting control on each of the other pairs of right and left lamps, that is, fog lamps 18b and 18g, tail lamps 18c and 18h, direction-indicating lamps 18d and 18i, and backup lamps 18e and 18j is performed in the same manner as described above, that is, with a shift of the prescribed time T.

It is probable that both of the right-hand lamp and the left-hand lamp of all pair of the lamps are lit. However, the application of voltage to the right-hand lamp and that to the left-hand lamp are shifted from each other by the prescribed time T, the total amount of instantaneous rush currents can be made smaller (specifically, made ½ or less) than in the case that the right-hand lamp and the left-hand lamp are driven simultaneously.

It goes without saying that the lamp driving apparatus and the lamp driving method according to the invention can be applied to not only the PWM lamp driving but also the DC lamp driving. The invention is effective in both of the PWM lamp driving and the DC lamp driving because at least initial parts of voltage application periods for lamps can be shifted from each other (in terms of waveform, the rises of voltages to be applied to the lamps can be shifted from each other).

The invention is not limited to the above-described embodiment and modification, improvement, etc. can be made as appropriate. Further, the shapes, forms, numbers, locations, etc. of the individual components are arbitrary (i.e., not limited) as long as they can implement the invention.

For example, in the above-described embodiment, the driving section 21 has the AND gates 16a–16j. A modification is possible in which the AND gates 16a–16j may be provided in a controller 23 (see FIG. 1). Incorporating the AND gates 16a–16j (logical multiplication circuits, operation circuits) into the controller 23 that is a one-chip microcomputer, for example, can make the cost of the entire lamp driving apparatus lower than in the case that the AND gates 16a–16j are separate from the controller 13. The details of this modification can easily be understood on the analogy of the above description, and hence will not be described to avoid redundancy.

What is claimed is:

1. A lamp driving apparatus, comprising:
   a controller, generating a control signal for lighting at least one of plural sets of lamps, each set having at least a first lamp and a second lamp, and generating a switching signal; and
   a lamp driver, supplying power to the at least one of sets of lamps in accordance with both of the control signal and the switching signal,
   wherein the switching signal causes the lamp driver to apply voltage to the first lamp and the second lamp of each of the at least one of sets of lamps with a shift of a prescribed time.

2. The lamp driving apparatus as set forth in claim 1, wherein the lamp driver performs a logic operation AND on the control signal and the switching signal, and supplies the power to the sets of lamps in accordance with operation results.

3. The lamp driving apparatus as set forth in claim 1, wherein the controller continues to output the control signal and the switching signal until turning-off of the set of lamps so that the lamp driver continuously applies the voltage to the sets of lamps.

4. The lamp driving apparatus as set forth in claim 1, wherein the controller outputs the control signal and the switching signal causing the lamp driver to repeat application and non-application of voltage to the sets of lamps in a prescribed cycle for dimming the sets of lamps.

5. The lamp driving apparatus as set forth in claim 1, wherein the switching signal includes a first switching signal for the first lamp and a second switching signal for the second lamp, the first switching signal being independent of the second switching signal; and
   wherein the controller monitors the first switching signal and the second switching signal, and generates the first switching signal and the second switching signal causing the lamp driver to apply the voltage to the first lamp and the second lamp with the shift of the prescribed time.

6. The lamp driving apparatus as set forth in claim 1, wherein the lamp driver includes:
   a logical multiplication circuit which performs a logical multiplication operation on the control signal and the switching signal, and which outputs a lamp load control signal on the basis of a logic operation result; and
   a switching element which supplies the power to the sets of lamps in accordance with the lamp load control signal.

7. The lamp driving apparatus as set forth in claim 6, wherein the lamp load control signal includes a first lamp load control signal for the first lamp and a second lamp load control signal for the second lamp, the first load control signal being independent of the second lamp load control signal; and wherein the controller monitors the first lamp load control signal and the second lamp load control signal, and generates the first switching signal and the second switching signal causing the lamp driver to apply the voltage to the first lamp and the second lamp with the shift of the prescribed time.

8. The lamp driving apparatus as set forth in claim 1, wherein the lamp is incandescent bulb having a filament.

9. A lamp driving apparatus, comprising:

a controller, generating a control signal for lighting at least one of plural sets of lamps, each set having at least a first lamp and a second lamp, and generating a switching signal, and outputting a lamp load control signal on the basis of the control signal and the switching signal; and a lamp driver, supplying power to the at least one of sets of lamps in accordance with the lamp load control signal, wherein the lamp load control signal causes the lamp driver to apply voltage to the first lamp and the second lamp of each of the at least one of sets of lamps with a shift of a prescribed time.

10. The lamp driving apparatus as set forth in claim 9, wherein the controller performs a logical multiplication operation on the control signal and the switching signal, and generates the lamp load control signal causing the lamp driver to supply the power to the sets of lamps in accordance with operation results.

11. The lamp driving apparatus as set forth in claim 9, wherein the controller continues to output the lamp load control signal until turning-off of the set of lamps so that the lamp driver continuously applies the voltage to the sets of lamps.

12. The lamp driving apparatus as set forth in claim 9, wherein the controller outputs the lamp load control signal causing the lamp driver to repeat application and non-application of voltage to the sets of lamps in a prescribed cycle for dimming the sets of lamps.

13. The lamp driving apparatus as set forth in claim 9, wherein the switching signal includes a first switching signal for the first lamp and a second switching signal for the second lamp, the first switching signal being independent of the second switching signal; and wherein the controller monitors the first switching signal and the second switching signal, and generates the first switching signal and the second switching signal causing the lamp driver to apply the voltage to the first lamp and the second lamp with the shift of the prescribed time.

14. The lamp driving apparatus as set forth in claim 9, wherein the controller includes a logical multiplication circuit which performs a logical multiplication operation on the control signal and the switching signal, and which generates the lamp load control signal on the basis of a logic operation result; and wherein the lamp driver includes a switching element which supplies the power to the sets of lamps in accordance with the lamp load control signal.

15. The lamp driving apparatus as set forth in claim 14, wherein the lamp load control signal includes a first lamp load control signal for the first lamp and a second lamp load control signal for the second lamp, the first load control signal being independent of the second lamp load control signal; and wherein the controller monitors the first lamp load control signal and the second lamp load control signal, and generates the first switching signal and the second switching signal causing the lamp driver to apply the voltage to the first lamp and the second lamp with the shift of the prescribed time.

16. The lamp driving apparatus as set forth in claim 9, wherein the lamp is incandescent bulb having a filament.

17. A method for driving lamp, comprising the steps of:

providing a plurality of sets of lamps, each set having at least a first lamp and a second lamp;

applying voltage to a first lamp and a second lamp of each of the at least one of the sets of lamps with a shift of a prescribed time; and monitoring the shift of the voltage to be applied to the first lamp and the second lamp.

18. The lamp driving method as set forth in claim 17, wherein the lamp is incandescent bulb having a filament.

19. The method of driving lamps as set forth in claim 17, wherein the voltage is continuously applied to the set of lamps after the sets of lamps are turned on.

20. The lamp driving method as set forth in claim 17, wherein voltage application and non-application to the sets of lamps are repeated in a prescribed cycle so that the set of lamps are dimmed after the sets of lamps are turned on.

\* \* \* \* \*